Feb. 28, 1956  L. R. WESTHOLT  2,736,442
LIFT ATTACHMENT FOR TRACTORS
Filed Aug. 30, 1952
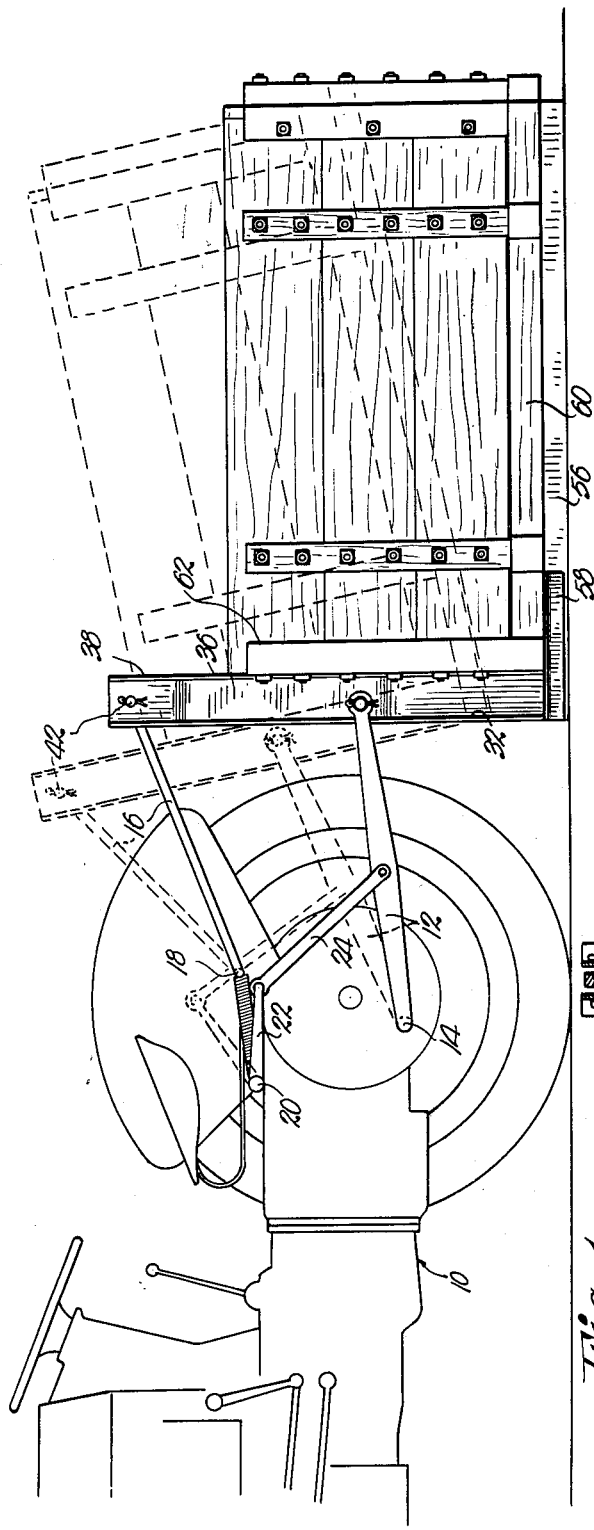
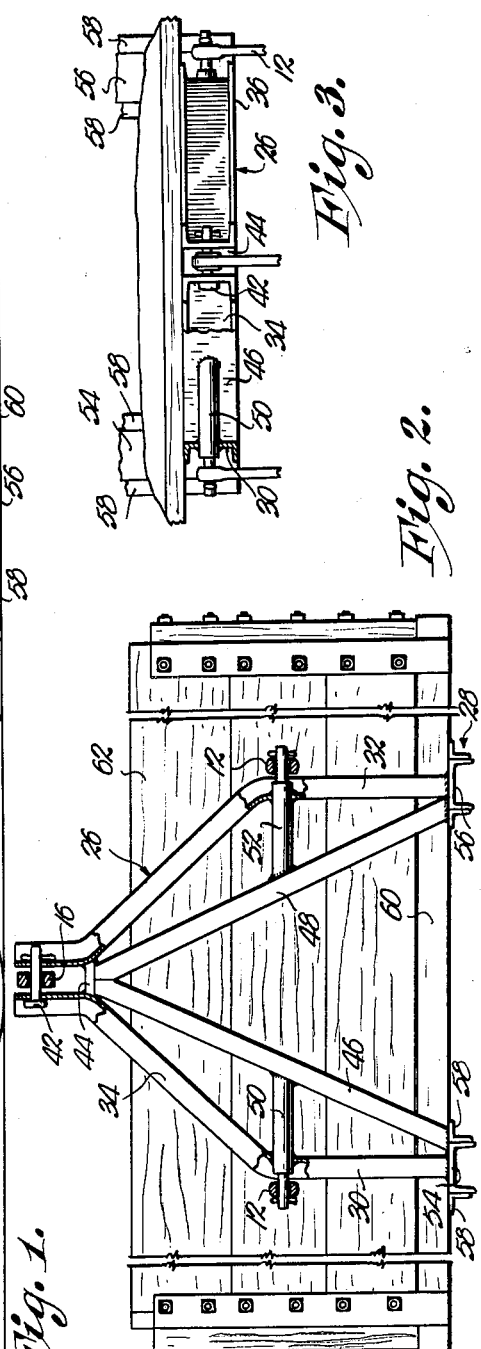
INVENTOR.
Lloyd R. Westholt
BY
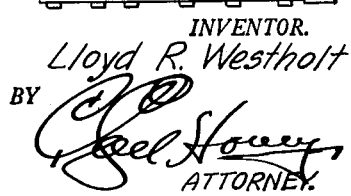
ATTORNEY.

United States Patent Office 2,736,442
Patented Feb. 28, 1956

2,736,442

LIFT ATTACHMENT FOR TRACTORS

Lloyd R. Westholt, Lee's Summit, Mo., assignor to Dwight Manufacturing Company, Inc., Lee's Summit, Mo., a corporation of Missouri Application August 30, 1952, Serial No. 307,258

1 Claim. (Cl. 214—130)

This invention relates to improvements in farm implements, and has for its pirmary object the provision of an attachment for tractors of the kind having power-lift mechanism adapted to receive a hitch assembly, the latter in turn being designed to receive platforms, grain boxes, stock racks and the like, thereby adapting the tractor for carrying and hauling heavy objects such as barrels, drums, rock, feed, grain, livestock and the like.

It is the most important object of the present invention to provide an assembly that includes an upstanding frame and a laterally extending support on the frame, there being a pair of pintles on the frame for pivotally receiving a pair of lower links and a pivot pin also on the frame for receiving an upper link, the links forming a part of hydraulic lift mechanism included as standard equipment on the tractor.

Another important object hereof is to provide a frame adapted for attachment to the power lift means of a tractor that is strong and durable and adapted not only for quick attachment and removal, so far as the tractor itself is concerned, but that may readily be adapted for mounting an ordinary flat, horizontal platform, a box or like container for material such as grain, and a stock rack similar in virtually all respects to such auxiliary equipment used on trucks, wagons and the like.

Other objects include important details of construction, all of which will be made clear or become apparent as the following specification progresses, reference being had to the accompanying drawing, wherein:

Figure 1 is a side elevational view of a trailer hitch assembly for tractors showing the same operably mounted on a tractor.

Fig. 2 is a rear elevational view of the assembly, parts being broken away and in section for clearness; and Fig. 3 is a fragmentary, top plan view, parts being broken away and in section to reveal details of construction.

Tractor 10, chosen for illustration in Fig. 1 of the drawing, is provided with power-lift mechanism that includes a pair of parallel lower links 12 mounted for swinging movement on a horizontal axis 14, and extending rearwardly beyond the tractor 10 from the common point of swinging movement as at 14.

The hydraulic mechanism also includes a link 16 mounted for swinging movement on a horizontal axis 18 within a vertical plane substantially midway between the two links 12. A hydraulic lift shaft 20 has a laterally extending crank 22 thereon for each link 12 respectively, the two cranks 22 being pivotally joined to the corresponding links 12 by connecting arms 24. Only one of the cranks 22 and connecting arms 24 is shown in Fig. 1 of the drawing.

The hitch assembly forming the subject matter of this invention is adapted for releasable connection with the links 12 and 16 and includes an upstanding frame broadly designated by the numeral 26, together with a laterally extending support broadly designated by the numeral 28. Frame 26 has a pair of upstanding, parallel legs 30 and 32, together with a pair of opposed frame pieces 34 and 36 integral with the legs 30 and 32 respectively. As shown in Fig. 2 of the drawing, the frame pieces extend upwardly and inwardly from the uppermost ends of the legs 30 and 32 and therefore, converge as the uppermost ends of the frame pieces 34 and 36 are approached. Frame pieces 34 and 36 are provided with upstanding, parallel projections 38 and 40 respectively, at the uppermost ends thereof and spaced apart to receive the link 16 therebetween. Extensions 38 and 40 are connected by a pivot pin 42 for receiving the outermost free end of the compression link 16.

The extensions 38 and 40 are joined by a plate 44 that receives the uppermost ends of a pair of braces 46 and 48 between the frame pieces 34 and 36 and the legs 30 and 32. Braces 46 and 48 extend from adjacent the lowermost ends of legs 30 and 32 and converge as the plate 44 is approached.

A pair of opposed pintles 50 and 52 mounted on the frame 26, pivotally receive the two lower links 12 in the manner illustrated by Figs. 2 and 3 of the drawing. Pintle 50 connects at the innermost end thereof with the brace 46 and passes through the leg 30 adjacent the uppermost end of the latter and immediately below the point of merger between leg 30 and frame piece 34. Pintle 52 extends in the opposite direction, joining brace 46 with leg 32.

The support 28 includes a pair of spaced, parallel beams 54 and 56 that are preferably U-shaped in cross-section as shown in Fig. 2. One end of the beam 54 is joined directly with the leg 30 and the brace 46 at the lowermost ends of the latter, and beam 56 is likewise joined at one end thereof to the brace 48 and the leg 32 at the lowermost ends of the latter. Opposed L-shaped reinforcements 58 are provided for the beams 54 and 56 throughout at least a portion of the length of the beams. It is seen therefore, that the L-shaped hitch assembly composed of frame 26 and support 28, is adapted to receive a platform 60 that may be joined directly to the beams 54 and 56 upon which the platform 60 rests.

Platform 60 may be used for supporting and hauling various types of products and articles, but if it is desired to haul loose grain and other material that requires container construction, a box 62 may be provided on the platform 60. Similarly, a stock rack (not shown) may be attached to the box 62 and extend thereabove for adapting the assembly to haul livestock and the like.

In Fig. 1 of the drawing, the assembly is illustrated by full-lines at the lowermost end of its path of travel and it is seen that the beams 54 and 56 will rest directly upon the ground, thereby facilitating loading and unloading as desired. Upon operation of the power lift assembly to rotate shaft 20 in one direction, links 12 will be lifted to raise the assembly to the dotted-line position shown in Fig. 1 of the drawing, whereby the entire assembly and its load can be carried by the tractor 10.

During the swinging movement of the links 12 on axis 14, link 16 steadies or stabilizes the frame 26 since link 16 connects the entire attachment to the tractor 10 as a unit. Means not shown, may be provided on the pintles 50 and 52 as well as on the pivot pin 42 for holding the same in place and when detachment is desired, the links 12 will swing outwardly away from each other from the pintles 50 and 52. It is not necessary to lift the assembly since attachment may be made when the same is resting upon the ground in the manner shown by full lines in Fig. 1 of the drawing.

Having thus described the invention what is claimed as new and desired to be secured by Letters Patent is:

For a tractor having hydraulic lift mechanism provided with a pair of spaced lower links mounted for swinging movement on a common horizontal axis, and an upper link mounted for swinging movement on a horizontal axis above said lower links, said links extending beyond the rear of the tractor, the improvement which comprises a lift attachment adapted for receiving a box including an upstanding frame; a laterally extending support on the frame, said frame having a pair of upright, parallel legs in spaced relation on the inner side of said lower links, an upwardly and inwardly extending framepiece integral with the uppermost end of each leg respectively, said framepieces terminating in upright, parallel end portions adapted to receive said upper link therebetween, said support comprising a pair of spaced, parallel beams extending from the frame oppositely to the links, said beams being normal to the legs at the lowermost end of the latter; an inclinded brace interconnecting the uppermost end of each framepiece respectively with corresponding beams; and means on said frame for each link respectively for pivotally connecting the links to the frame, said means including a pivot pin joining the upper link and said end portions, a pair of oppositely-extending pintles, one for each of said lower links respectively, each pintle joining one leg of the frame with a proximal brace, said pintles and said pin being parallel with the swinging axes of the links, and the pintles being at the uppermost ends of said legs, whereby the attachment may be shifted to and from a position resting on the ground with said beams horizontally disposed and said frame in a vertical position.

References Cited in the file of this patent

UNITED STATES PATENTS

| | | |
|---|---|---|
| 2,341,807 | Olmstead et al. | Feb. 15, 1944 |
| 2,505,639 | Eaton | Apr. 25, 1950 |
| 2,531,768 | Cline et al. | Nov. 28, 1950 |
| 2,551,901 | Richardson | May 8, 1951 |
| 2,554,900 | Davies | May 29, 1951 |
| 2,670,089 | Peterson | Feb. 23, 1954 |